United States Patent
Servadio et al.

(10) Patent No.: US 7,025,563 B2
(45) Date of Patent: Apr. 11, 2006

(54) STATOR VANE ASSEMBLY FOR A GAS TURBINE ENGINE

(75) Inventors: Michael A. Servadio, Tolland, CT (US); R. Brian Richardson, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 49 days.

(21) Appl. No.: 10/742,725

(22) Filed: Dec. 19, 2003

(65) Prior Publication Data

US 2005/0135928 A1    Jun. 23, 2005

(51) Int. Cl.
   *F01D 25/26* (2006.01)
(52) U.S. Cl. .................................. 415/137; 415/191
(58) Field of Classification Search ............... 415/137, 415/191
   See application file for complete search history.

(56) References Cited

U.S. PATENT DOCUMENTS

| | | | |
|---|---|---|---|
| 3,042,367 A * | 7/1962 | Welsh | 415/137 |
| 4,868,963 A | 9/1989 | Corsmeier et al. | |
| 4,896,499 A * | 1/1990 | Rice | 60/792 |
| 4,897,021 A | 1/1990 | Chaplin et al. | |
| 4,953,282 A | 9/1990 | Corsmeier et al. | |
| 5,118,120 A * | 6/1992 | Drerup et al. | 415/139 |
| 5,320,487 A | 6/1994 | Walker et al. | |
| 6,131,384 A * | 10/2000 | Ebel | 60/797 |
| 6,139,264 A | 10/2000 | Schilling | |
| 6,347,508 B1 | 2/2002 | Smallwood et al. | |
| 6,607,355 B1 | 8/2003 | Cunha et al. | |
| 2005/0008486 A1* | 1/2005 | Malmborg | 415/209.4 |

* cited by examiner

*Primary Examiner*—Edward K. Look
*Assistant Examiner*—Richard A. Edgar
(74) *Attorney, Agent, or Firm*—Carlson, Gaskey & Olds

(57) ABSTRACT

A low-pressure compressor exit stator assembly for a gas turbine includes a multiple of vanes mounted between a full hoop outer shroud and an inner shroud. The outer shroud and inner shroud are mounted to the intermediate case structure. A seal is located between the outer shroud and a bleed duct structure to accommodate thermal growth mismatch.

20 Claims, 4 Drawing Sheets

STATOR VANE ASSEMBLY FOR A GAS TURBINE ENGINE

BACKGROUND OF THE INVENTION

The present invention relates to a stator assembly, and more particularly to a low-pressure compressor exit stator assembly which interfaces with a full hoop outer shroud pressure vessel within a gas turbine engine.

A gas turbine engine typically includes a rotor assembly which extends axially through the engine. A stator assembly is spaced radially from the rotor assembly and includes an engine case which circumscribes the rotor assembly. A flow path for working medium gases is defined within the case. The flow path extends generally axially between the stator assembly and the rotor assembly.

The rotor assembly includes arrays of rotor blades. The arrays of rotor blades extend radially outward across the working medium flow path in proximity with the case. Arrays of stator vane assemblies are interdergitated with the arrays of rotor blades. The stator vanes extend inward from the case across the working medium flow path into proximity with the rotor assembly to guide the working medium gases when discharged from the rotor blades.

An exit stator vane assembly typically includes a multiple of stator vanes, an outer case, and an inner case, which extend circumferentially about the working medium flow path. Conventional stator vane assemblies utilize a pierced aluminum outer shroud that receives the vane tip through the shroud and provide surface area for potting with a rubber compound. The rubber compound provides a seal between the flow path and an intermediate case core compartment area. The outer shroud is supported by the intermediate case at the rear and allowed to "float" radially through a bayonet attachment.

The material of the outer shroud typically differs from the stator vanes and attachment interfaces. The outer shroud is typically manufactured of aluminum for weight/cost and material compatibility with an aluminum bleed duct, whereas other stator assembly components are manufactured of titanium for increased strength. Titanium and aluminum have different thermal growths and the dimensional changes which result from temperature excursions during operation have to be absorbed at the outer shroud to bleed duct interface. That is, the outer shroud section bends or flexes to manage the level of stresses and contact loads through deflection. Although effective, conventional pierced shroud arrangements may not effectively withstand the high pressure and temperature environments in modern gas turbine engines over prolonged time periods.

Some outer shrouds are of a full hoop geometry to create an uninterrupted vessel which withstands the high pressure and temperature environments typical of advanced gas turbine engines. However, a full hoop design may be too stiff to permit conventional stress management through shroud flexibility. Mounting or a full hoop outer shroud have heretofore required relatively complicated attachment arrangements which limits full hoop outer shroud utilization to certain areas within the gas turbine engine.

Accordingly, it is desirable to provide a stator assembly with a full hoop outer shroud that satisfies the mounting, leakage, durability and thermally induced deflection requirements common to a gas turbine engine.

SUMMARY OF THE INVENTION

The low pressure compressor exit stator assembly according to the present invention includes a multiple of vanes mounted between a full hoop outer shroud and an inner shroud. The outer shroud is supported against an intermediate case structure and allowed to float radially through a bayonet arrangement. The inner shroud is bolted to the intermediate case. The outer shroud is manufactured of aluminum and the inner shroud is manufactured of titanium. Titanium and aluminum have different thermal growths and the dimensional changes which result from temperature excursions during operation are absorbed at the outer shroud to bleed duct interface through a seal located therebetween. The seal accommodates the thermal mismatch.

The present invention therefore provides a stator assembly with a full hoop outer shroud that satisfies the mounting, leakage, durability, and thermally induced deflection requirements common to a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
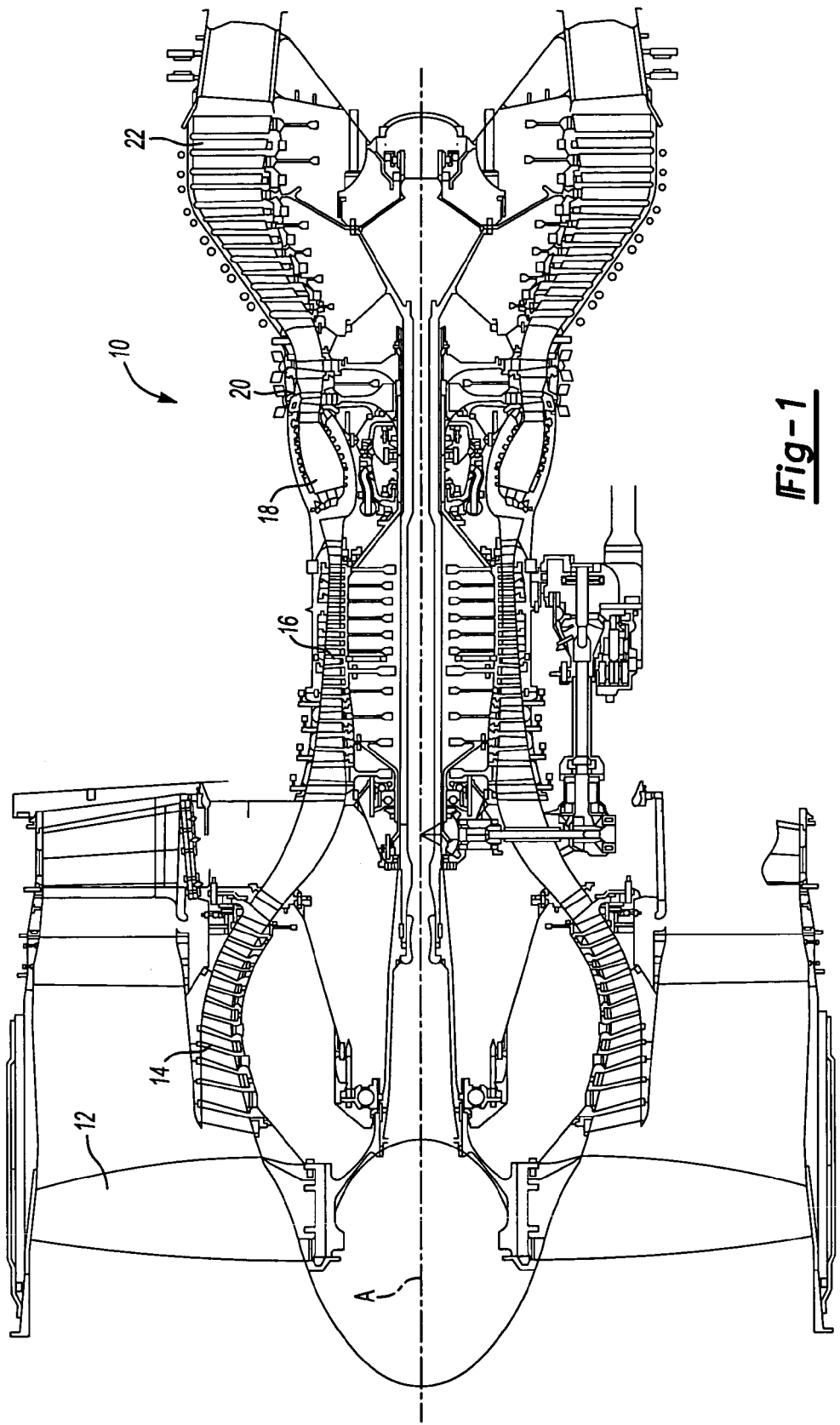
FIG. 1 is a general sectional view an exemplary gas turbine for use with the present invention.

FIG. 1 illustrates a general schematic sectional view of a gas turbine engine 10. The gas turbine engine 10 is defined about an engine centerline A about which the various engine sections rotate. Generally, the engine 10 includes a fan section 12, a low pressure compressor section (LPC) 14, a high pressure compressor section (HPC) 16, a combustor section 18, a high pressure turbine section 20 and a low pressure turbine section 22. It should be understood that although a particular arrangement is disclosed in the illustrated embodiment, other arrangements will benefit from the instant invention including gas turbines used for electrical power generation and for aircraft.

Figure 2:
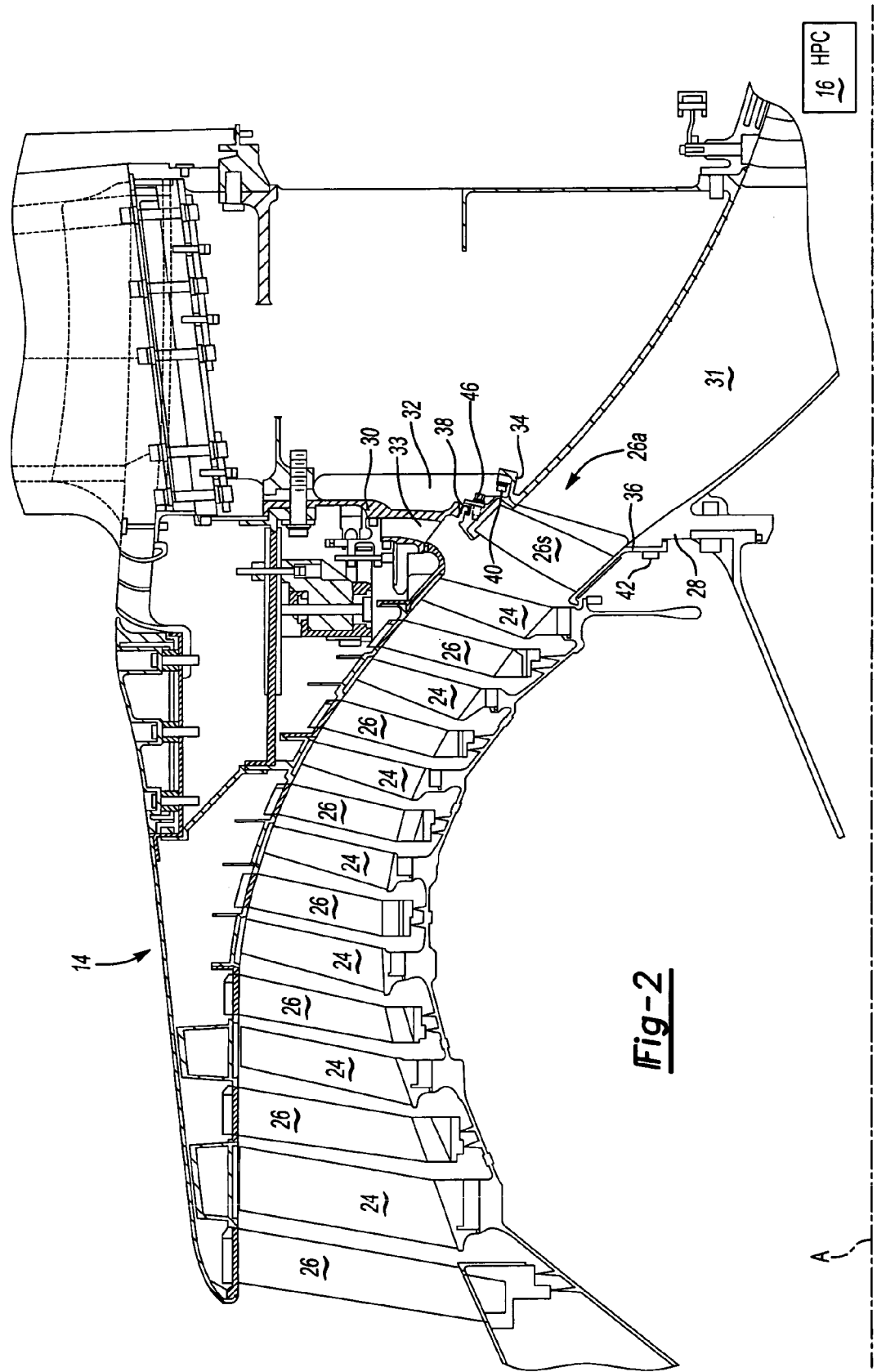
FIG. 2 is an expanded sectional view of a low pressure compressor section of the gas turbine engine of FIG. 1.

Referring to FIG. 2, the low pressure compressor section 14 includes alternating rows of rotary airfoils or blades 24 and static airfoils or vanes 26. One vane assembly 26 is a low-pressure compressor (LPC) exit stator assembly 26*a* also referred to as "4th" stage. It should be understood that although a particular vane is illustrated in the disclosed embodiment, any vane will benefit from the present invention.

The LPC exit stator assembly 26*a* is mounted between an intermediate case structure 28 and a bleed duct structure 30 of the engine 10. The bleed duct structure 30 forms a core compartment 32 and a bleed duct 33.

The low pressure compressor exit stator assembly 26*a* provides a flow transition passage for high temperature and pressure engine core airflow which exits the LPC 14, travels through a transition duct 31 formed by the intermediate case structure 28 and into the HPC 16.

Figure 3:
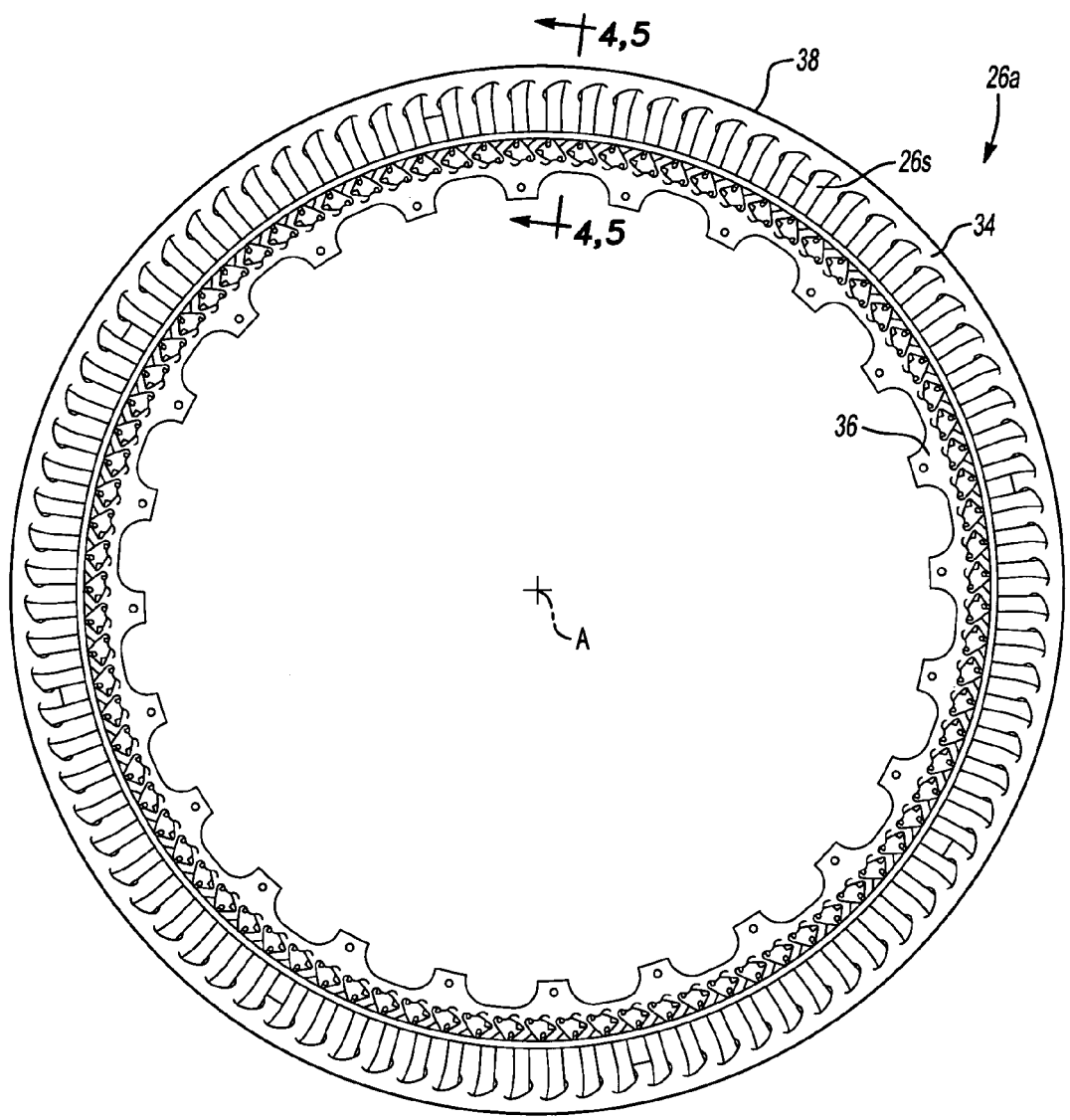
FIG. 3 is a schematic front view of a stator assembly according to the present invention.

The LPC exit stator assembly 26*a* includes a multiple of vanes 26*s* mounted between a full hoop outer shroud 34 and an inner shroud 36 (also illustrated from the front in FIG. 3).

The vanes 26s are attached between the full hoop outer shroud 34 and an inner shroud 36. It should be understood that the term full hoop is defined herein as an uninterrupted member such that the vanes do not pass through apertures formed therethrough as in conventional stator assemblies.

The outer shroud 34 creates a flowpath boundary between the LPC 14 and the intermediate case core compartment 32. The interface between the low pressure compressor exit stator assembly 26a and the bleed duct 33 may potentially be a leakage path which requires positive sealing to prevent loss of air and engine performance.

The full hoop outer shroud 34 provides a pressure vessel for the LPC exit stator assembly 26a. The outer shroud 34 is preferably manufactured of aluminum and the inner shroud 36 is preferably manufactured of titanium. Titanium and aluminum have different thermal growths and the dimensional changes that result from temperature excursions during operation are absorbed at the outer shroud 34 to bleed duct 30 interface. A seal 38 (FIG. 4) preferably accommodates the thermal mismatch. The seal 38 is preferably a high deflection capability seal such as an "Omni Seal" manufactured by Saint-Gobain of Garden Grove, Calif. which absorbs the thermal induced deflections and provides sealing with minimal wear to the adjacent structures 30, 34.

The outer shroud 34 is supported against the intermediate case structure 28 with a bayonet fastener 40. The inner shroud 36 is mounted to the intermediate case structure 28 with a fastener 42 such as a bolt. The seal 38 is located between the outer shroud 34 and the bleed duct structure 30 (also illustrated in FIG. 4) to accommodate differential movement therebetween.

Figure 4:
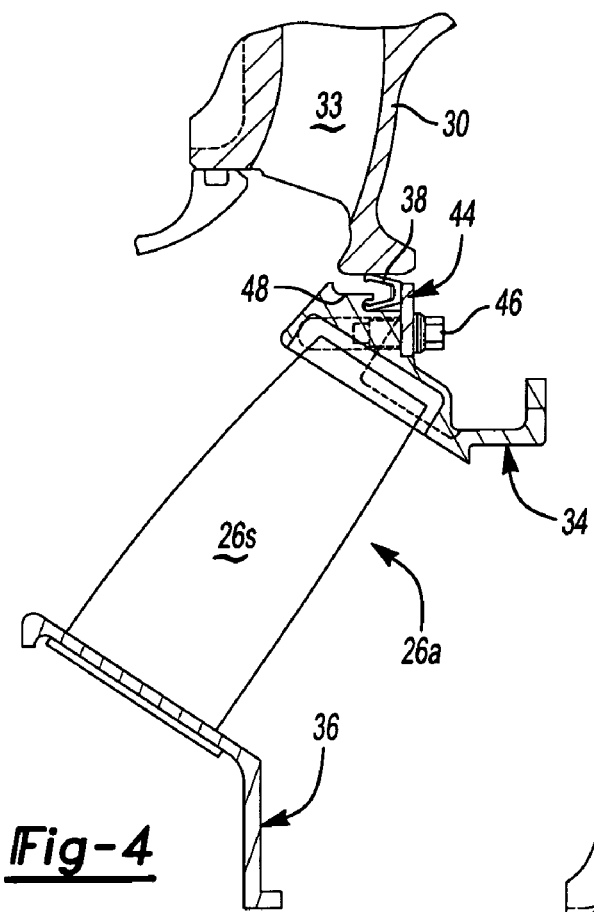
FIG. 4 is an expanded sectional view of a exit stator assembly according to the present invention.

Referring to FIG. 4, the LPC exit stator assembly 26a seal 38 is retained through a retainer 44 and a threaded fastener 46 arrangement. The threaded fastener 46 is threaded into the outer shroud 34 such that the seal is trapped between the retainer 44 and the outer shroud 34. The fastener arrangement permits maintenance and replacement of the seal. The seal 38 is of a generally "U" or "V" shape such that the open end thereof is preferably engaged with a lip 48 formed into the outer shroud 34.

Figure 5:
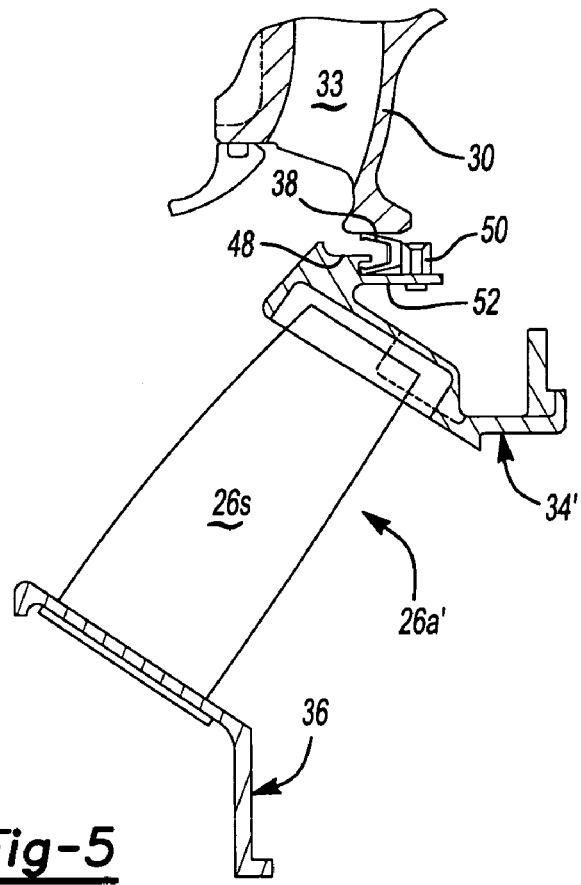
FIG. 5 is an expanded sectional view of another a stator assembly according to the present invention.

Referring to FIG. 5, the seal 38 is alternatively retained through a riveted retainer ring 50 which is located through the outer shroud 34'. The outer shroud 34' provides a ledge 52 through which the riveted retainer ring 50 is received to retain the seal 38 between the riveted retainer ring 50 and the lip 48.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A low pressure compressor exit stator assembly comprising:
   a full hoop outer shroud which defines a lip about an outer diameter of said full hoop outer shroud; and
   a seal mounted to said full hoop outer shroud, said seal including an open edge which at least partially surrounds said lip.

2. The low pressure compressor exit stator assembly as recited in claim 1, wherein said seal defines a U-shape in cross section, the open edge of the U-shape at least partially surrounding said lip.

3. The low pressure compressor exit stator assembly as recited in claim 1, wherein said seal defines a V-shape in cross section, the open edge of the V-shape at least partially surrounding said lip.

4. The low pressure compressor exit stator assembly as recited in claim 1, wherein said seal is retained through a retainer which mounts adjacent a closed edge of said seal opposite said open edge.

5. The low pressure compressor exit stator assembly as recited in claim 1, further comprising a multiple of low pressure compressor exit vanes mountable to said full hoop outer shroud, said multiple of low pressure compressor exit vanes received within an uninterrupted portion of said full hoop outer shroud without extending through said full hoop outer shroud.

6. The low pressure compressor exit stator assembly as recited in claim 1, further comprising a multiple of low pressure compressor exit vanes mountable upstream of a transition duct between a low pressure compressor section and a high pressure compressor section of a gas turbine engine.

7. The low pressure compressor exit stator assembly as recited in claim 1, wherein said full hoop outer shroud is uninterrupted.

8. A stator assembly comprising:
   a full hoop outer shroud;
   an inner shroud;
   a multiple of low pressure compressor exit vanes mounted between said full hoop outer shroud and said inner shroud; and
   a seal mounted to said outer shroud.

9. The stator assembly as recited in claim 8, wherein said full hoop outer shroud is uninterrupted.

10. The stator assembly as recited in claim 8, wherein said full hoop outer shroud is manufactured of aluminum.

11. The stator assembly as recited in claim 8, wherein said inner shroud is manufactured of titanium.

12. The stator assembly as recited in claim 8, wherein said outer shroud is mounted to an intermediate case structure of a gas turbine engine.

13. The staler assembly as recited in claim 8, wherein said multiple of low pressure compressor exit vanes are located upstream of a transition duct between a low pressure compressor section and a high pressure compressor section of a gas turbine engine.

14. The stator assembly as recited in claim 8, wherein said seal is located about an outer diameter of said outer shroud upon a lip which extends from said outer shroud.

15. The stator assembly as recited in claim 8, further comprising a retainer which traps said seal upon a lip which extends from said outer shroud.

16. The stator assembly as recited in claim 8, further comprising a rivet which traps said seal upon a lip which extends from said outer shroud.

17. A gas turbine engine comprising:
an intermediate case structure;
a bleed duct structure;
a full hoop outer shroud mounted to said intermediate case structure;
an inner shroud mounted to said intermediate case;
a multiple of low pressure compressor exit vanes mounted between said full hoop outer shroud and said inner shroud; and
a seal mounted to said full hoop outer shroud, said seal engaged with said bleed duct structure.

18. The gas turbine engine as recited in claim 17, wherein said full hoop outer shroud is uninterrupted.

19. The gas turbine engine as recited in claim 17, wherein said seal seals a low pressure compressor compartment with said intermediate structure within said bleed duct structure.

20. The gas turbine engine as recited in claim 17, wherein said multiple of low pressure compressor exit vanes are located upstream of a transition duct between a low pressure compressor section and a high pressure compressor section of the gas turbine engine.

* * * * *